US007016957B2

(12) United States Patent
Morimoto et al.

(10) Patent No.: US 7,016,957 B2
(45) Date of Patent: *Mar. 21, 2006

(54) DISTRIBUTED DATA PROCESSING SYSTEM AND ERROR ANALYSIS INFORMATION SAVING METHOD APPROPRIATE THEREFOR

(75) Inventors: Takahiro Morimoto, Yokohama (JP); Takafumi Nogami, Yokohama (JP); Shigehiro Hatakeyama, Yokohama (JP); Naoyuki Matsunaga, Yokohama (JP); Takafumi Jinsenji, Yokohama (JP); Toshio Hata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 701 days.

This patent is subject to a terminal disclaimer.

(21) Appl. No.: 10/127,567

(22) Filed: Apr. 23, 2002

(65) Prior Publication Data

US 2002/0120738 A1    Aug. 29, 2002

Related U.S. Application Data

(63) Continuation of application No. 09/243,796, filed on Feb. 3, 1999, now Pat. No. 6,397,244.

(30) Foreign Application Priority Data

Feb. 5, 1998   (JP)   ................................. 10-024609

(51) Int. Cl.
   *G06F 11/00*   (2006.01)
(52) U.S. Cl. ........................... 709/224; 714/25; 714/32
(58) Field of Classification Search ................ 709/223, 709/224; 714/25, 32
   See application file for complete search history.

(56) References Cited

U.S. PATENT DOCUMENTS

| 5,165,031 A | 11/1992 | Pruul et al. ............... 714/25 |
| 5,572,533 A | 11/1996 | Sunada et al. ............. 714/712 |
| 5,586,254 A | 12/1996 | Kondo et al. ............... 714/25 |
| 5,841,960 A | 11/1998 | Ibusuki et al. ............. 714/32 |
| 5,901,320 A | 5/1999 | Takahashi et al. .......... 709/223 |
| 5,984,178 A | 11/1999 | Gill et al. ................. 235/379 |
| 6,023,775 A | 2/2000 | Fujii ........................ 714/48 |
| 6,199,180 B1 | 3/2001 | Ote et al. .................. 714/31 |
| 6,230,198 B1 * | 5/2001 | Dawson et al. ............. 709/224 |

FOREIGN PATENT DOCUMENTS

JP   5250229   9/1993

* cited by examiner

*Primary Examiner*—Patrice Winder
(74) *Attorney, Agent, or Firm*—Antonelli, Terry, Stout and Kraus, LLP.

(57) ABSTRACT

A computer network comprising a monitoring apparatus and a plurality of servers, wherein the servers respectively have a plurality of software programs, and a data file for storing error analysis information to be utilized for analysis of the cause of an error upon occurrence of error, for each software program. Further, the servers respectively have a function to transmit an error notifying message including a software identifier of a software program executed upon occurrence of error to the monitoring apparatus. The monitoring terminal apparatus has a function to instruct at least one server, specified based on the software identifier included in the error notifying message, to save error analysis information, in response to the error notifying message received from any one of the servers.

16 Claims, 4 Drawing Sheets

FIG. 5

| MESSAGE ID | DATA FILE ID | OUTPUT FILE ID | OBJECT SERVER ID |
|---|---|---|---|
| XXXXX | XXXXXX XXXXXX ⋮ | XXXXXX XXXXX ⋮ | XXXXXXX XXXXXX ⋮ |
| XXXXX | XXXXXX XXXXXX ⋮ | XXXXXX XXXXX ⋮ | XXXXXXX XXXXXX ⋮ |

DISTRIBUTED DATA PROCESSING SYSTEM AND ERROR ANALYSIS INFORMATION SAVING METHOD APPROPRIATE THEREFOR

This is a continuation of parent application Ser. No. 09/243,796, filed Feb. 3, 1999 now U.S. Pat. No. 6,397,244.

BACKGROUND OF THE INVENTION

1. Field of the Invention

The present invention relates to a technique of saving error analysis information upon occurrence of error, and more particularly, to a method of saving software error analysis information appropriate for a distributed data processing system comprising a plurality of servers, and a saving system for saving error analysis information.

2. Description of the Related Art

A group of software products (programs), which run on a distributed data processing system comprising a plurality of servers, realize large-scale system operation by execution of data processing by the plurality of servers in cooperation with each other, as well as local data processing within each server. In this distributed data processing system, if a software error occurs in one server when data processing is performed, error analysis information of the server is occasionally insufficient to find the cause of the error. Further, since almost all the error analysis information necessary for investigation into the cause of error such as trace information of a software product is managed by a wrap around function, if saving of error analysis information into a saving file is delayed, the important information may be lost.

Generally, when a system error including a software bug occurs, an error alarm message notifying the occurrence of error is displayed on a monitoring terminal apparatus. Conventionally, when an error alarm message is displayed on the display of the monitoring terminal, an operator of the monitoring terminal notifies a system administrator (otherwise, a manufacturer or the like) of the occurrence of error. Then, the system administrator checks the content of the error and the server where the error has occurred (hereinafter, referred to as a "troubled server"), and starts to collect error analysis information necessary for investigation into the cause of the error.

If an error occurs when data processing is performed by a plurality of servers in cooperation with each other, it is necessary to collect error analysis information from not only the troubled server but also the other servers than the troubled server. In this case, it is necessary to specify servers from which error analysis information is to be collected, and instruct these servers to quickly save error analysis information or transfer the information to the monitoring terminal apparatus.

As a conventional technique for collecting log data from a plurality of computers, Japanese Published Unexamined Patent Application No. Hei 5-250229, for resolving the problem of an increase in load caused by automatic log-data transmission request to all the computers, proposes to analyze log data transmitted from respective computers, and to require a computer, in which an error has been found in its log data, to transmit log data next time, while not to require transmission of log data of a computer, in which no log data error has been found, so as to reduce log-data transmission load on normally-operating computer. However, in the above conventional art, as the other computers in cooperation with the troubled computer are excused from the next log-data transmission as long as these computers normally perform data processing, the conventional art cannot be applied to the distributed data processing system requiring error analysis information also from normal computers.

In the conventional method of collecting error analysis information, upon occurrence of system error, a specific server is instructed to save its error analysis information by judgment of an operator of a monitoring terminal apparatus or a system administrator. As the analysis information saving is made based on the judgment and instructive operation from the monitoring terminal by an operator or a system administrator, it takes much time to save and collect the error analysis information, which might lose important information.

SUMMARY OF THE INVENTION

Accordingly, an object of the present invention is to provide an error analysis information saving method which automatically saves error analysis information without the judgment and terminal operation by an operator or a system administrator.

Further, another object of the present invention is to provide an error analysis information saving method which automatically saves error analysis information of a server when an error is detected in the server, and further saves error analysis information of other servers related to the error.

Further, another object of the present invention is to provide a distributed data processing system and a computer network which automatically and quickly save error analysis information stored in a plurality of servers when an error is detected in one of the servers.

Further, another object of the present invention is to provide a monitoring terminal apparatus which, when an error is detected in one server, automatically specifies error analysis information of other servers related to the error, and instructs a plurality of servers to save error analysis information.

The foregoing objects are attained by providing a computer network having a monitoring apparatus, comprising: a plurality of servers connected to the monitoring apparatus via a communication network; wherein the plurality of servers respectively have a plurality of software programs, and have a data file for storing error analysis information to be utilized for investigation into a cause of an error upon occurrence of the error, for each software program, and means for transmitting an error notifying message, including an identifier of a software program executed when the error has occurred, to the monitoring apparatus; and wherein the monitoring apparatus has means for instructing at least one server, specified based on the software identifier included in the error notifying message, to save the error analysis information, in response to one error notifying message received from any one of the servers.

Further, the foregoing objects are attained by providing a distributed data processing system comprising: a plurality of servers respectively having a function to execute data processing in cooperation with each other via a communication network; and a monitoring terminal apparatus connected to the communication network, wherein the monitoring terminal apparatus has a management table containing a plurality of data records, each having an index code including a software identifier and at least one set of resource definition data defining resources related to saving operation of error analysis information, and wherein when the monitoring terminal apparatus receives an error notifying message including the software identifier from any one of the servers, the monitoring terminal apparatus instructs a server, defined by a data record corresponding to the software identifier as one of the resources, to save the error analysis information.

More specifically, each data record in the management table includes at least one set of resource definition data defining a server to perform saving operation on error analysis information, a data file including the error analysis information and an output file where the error analysis information is saved, and the monitoring terminal apparatus designates the data file and the output file defined by the resource definition data, and instructs the server to save the error analysis information.

According to a preferred embodiment of the present invention, at least one of the data records stored in the management table includes plural sets of resource definition data corresponding to one index code, and the monitoring terminal apparatus instructs a plurality of servers, defined by the plural sets of resource definition data, to save the error analysis information, in response to reception of one error notifying message.

Further, according to the preferred embodiment of the present invention, the index code of each data record stored in the management table includes an additional code accompanying the software identifier, indicative of error type, and the error notifying message transmitted from the server has a message identifier including the software identifier and the additional code indicative of the type of an error detected in the server, further, when the monitoring terminal apparatus receives an error notifying message from any one of the servers, the monitoring terminal apparatus searches the management table based on the message identifier of the received message, and instructs saving of the error analysis information if it is determined that a specific type of error has occurred in a specific software program designated in advance in the management table.

In accordance with the present invention, provided is a monitoring terminal apparatus connected to a plurality of servers via a communication network, comprising: a management table containing plural sets of resource definition data defining resources related to saving operation of error analysis information corresponding to a plurality of index codes each including a software identifier of a software program executed on each of the servers; means for, when an error notifying message including the software identifier is received from any one of the servers, searching the management table for at least one set of resource definition data corresponding to the software identifier included in the error notifying message; and means for transmitting a control message instructing to save the error analysis information to a server defined by the searched resource definition data as one of the resources.

Further, in accordance with the present invention, provided is an error analysis information saving method in a distributed data processing system comprising a plurality of servers which perform data processing in cooperation with each other via a communication network and a monitoring terminal apparatus connected to the communication network, wherein the monitoring terminal apparatus has a management table for storing a plurality of data records each comprising a software identifier of a software program and at least one set of resource definition data defining resources related to saving operation of error analysis information, the method comprising the steps of: transmitting an error notifying message including the software identifier of a software being executed, from one of the plurality of servers where a software error has been detected during data processing, to the monitoring terminal apparatus; upon reception of the error notifying message, referring to data record corresponding to the software identifier of the error notifying message stored in the management table, by the monitoring terminal apparatus; instructing a server, defined by the referred data record as one of the resources, to save the error analysis information, from the monitoring terminal apparatus; and performing saving operation on the error analysis information by the server instructed to save the information.

More specifically, the saving instruction to save the error analysis information is made by designating a source file and an output file defined by the data record as one of the resources, and instructing the server to save the error analysis information, in response to reception of the error notifying message, by the monitoring terminal apparatus. In the preferred embodiment of the present invention, the monitoring terminal apparatus refers to a plurality of data records corresponding to the software identifier of the error notifying message stored in the management table, in response to reception of the error notifying message, and instructs a plurality of servers, defined by the referred plural data records, to save the error analysis information.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing the structure of an error notifying message management table of the monitoring terminal 11;

DETAILED DESCRIPTION OF THE PREFERRED EMBODIMENTS

Figure 1:
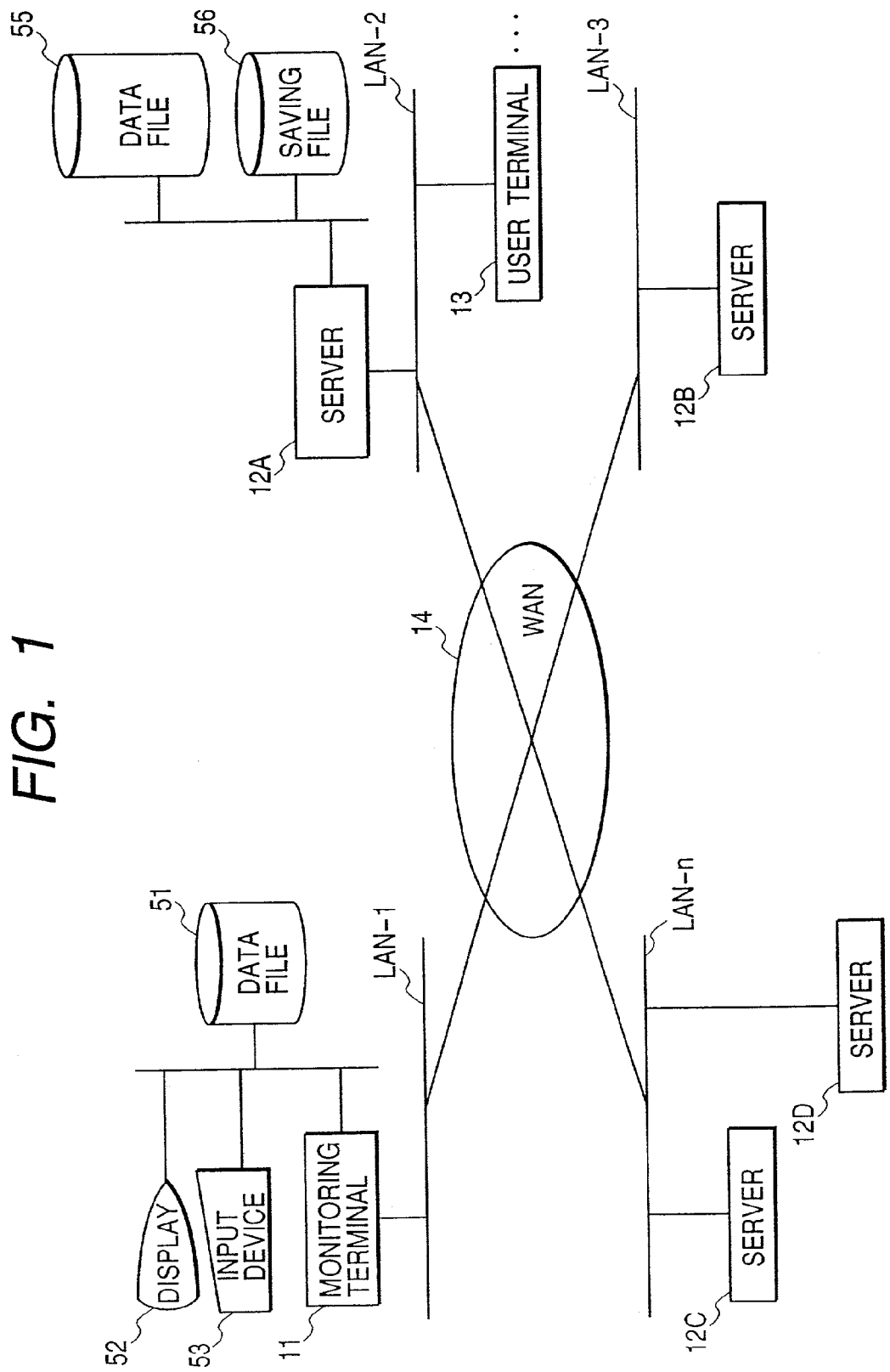
FIG. 1 is a block diagram showing the configuration of a distributed data processing system to which the present invention is applied.

FIG. 1 shows an example of computer network configuring a distributed data processing system according to the present invention.

The distributed data processing system comprises a monitoring terminal 11, a plurality of servers 12 (12A to 12D) and a plurality of user terminals 13 connected via a communication network to each other. In the present embodiment, the monitoring terminal 11 is connected to a LAN-1, and the servers 12A to 12D are connected to LAN-2 to LAN-n. These LAN's are interconnected via a wide area network (WAN) 14. Note that the respective LAN1 to LAN-n include a plurality of user terminals 13 to utilize the servers 12, however, for the simplification of explanation, FIG. 1 only shows one terminal connected to the LAN-2.

Figure 2:
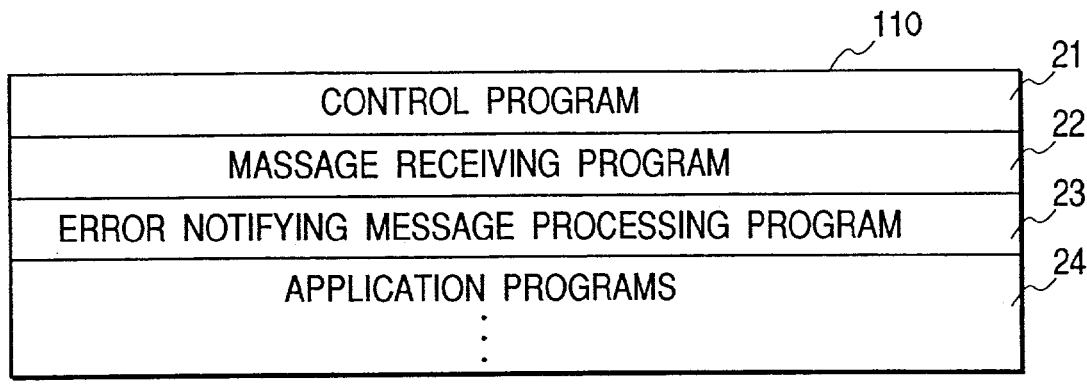
FIG. 2 is a table explaining software in a monitoring terminal 11.

The monitoring terminal 11 has a data file 51 for storing an error notifying message management table 30 to be described later, a display 52 and an input device 53. Further, as shown in FIG. 2, the monitoring terminal 11 has a program memory 110 (omitted in FIG. 1) for storing a notification general management control program (control program) 21 for controlling the overall monitoring terminal, a message receiving program 22 for receiving messages from the respective servers, an error notifying message processing program 23 for discriminating an error notifying message from the received messages and instructing the corresponding server to save error analysis information, and various application programs 24.

Figure 3:
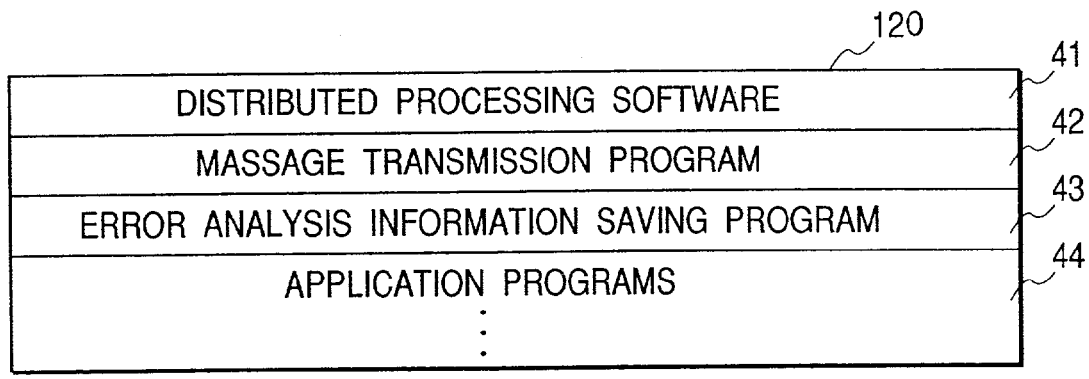
FIG. 3 is a table explaining software in a server 12.

On the other hand, the servers 12 (12A to 12D) respectively have a data file 55 and a saving file 56 for saving the error analysis information, as typically shown in the server 12A. Further, as shown in FIG. 3, the servers 12 have a program memory 120 (omitted in FIG. 1) as another element, for storing distributed processing software 41, a SYSLOG message transmission program 42, an error analysis information saving program 43 and other application programs 44. The distributed processing software 41 includes a plurality of programs for transaction management, data base control, batch processing and the like.

The respective servers 12 perform data processing in response to user's operation from the user terminal 13, in cooperation with each other by interactively transmitting/receiving messages if necessary, in accordance with the distributed processing software 41. Note that the respective servers 12 which operate as the distributed processing system in cooperation with each other, also operate as local data processing systems to independently perform the application programs 44. Further, the monitoring terminal 11 which performs the monitoring function also operates as a local data processing system by performing application programs.

In the respective servers 12, various data generated by execution of the distributed processing software 41 are stored in the data file 55. In addition, trace information generated at a significant point in data processing progress, is stored in a file area corresponding to currently-executed software program in the data file 55, in preparation for investigation into the cause of error and recovery processing upon occurrence of error.

The respective servers 12 generate a SYSLOG message 60 periodically or upon recording of the trace information, apart from messages communicated for data processing in cooperation with the other servers, and transmit the SYSLOG message 60 to the monitoring terminal 11.

Figure 4:
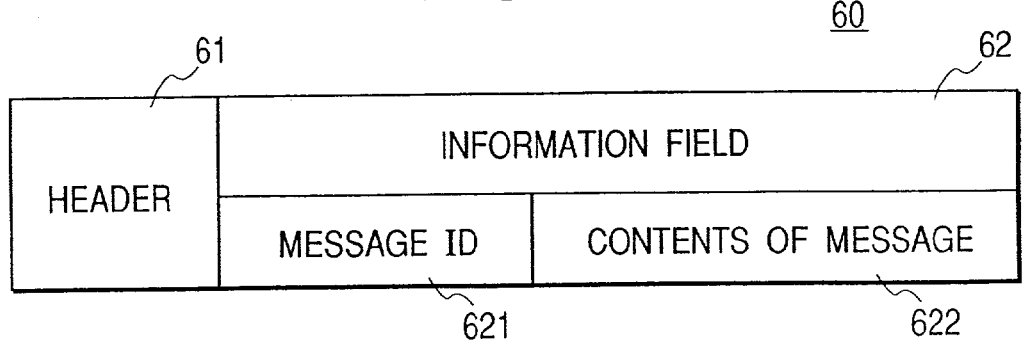
FIG. 4 is a table showing the format of a message transmitted from the server to the monitoring terminal.

As shown in FIG. 4, the SYSLOG message 60 comprises a header 61 and an information field 62. The header 61 includes a destination address where the address of the monitoring terminal is set, and a source address where the address of the transmission source server is set. The information field 62 includes a message ID 621 and contents of message 622.

The message ID 621 comprises a main code indicative of an identifier of an executed software (program) and an additional code indicative of error status. For example, bit information to indicate existence/absence of error, warning indicative of recovery of error by retry processing or the like, is set as the additional code. Further, in the contents of message 622, normally, log information is set, and upon occurrence of error, information on the content of the error is set.

The SYSLOG message 60 is transmitted onto the LAN by the message transmission program 42, and transferred to the monitoring terminal 11 via the WAN 14. In the following description, a SYSLOG message where a status code indicative of occurrence of error is added as the additional code is especially referred to as an "error notifying message".

FIG. 5 shows the structure of an error notifying message management table 30 formed in the data file 51 of the monitoring terminal 11.

In the error notifying message management table 30, at least one set of resource definition data is registered corresponding to a specific message ID 31, which necessitates acquisition or saving of error analysis information. The message ID 31 is used as an index code in the error notifying message management table 30, corresponding to one of message ID's 621 added to error notifying messages 60. Further, the resource definition data specifies a plurality of resources related to saving operation of error analysis information. The resource definition data includes a data file ID 32 indicative of source files having error analysis information, an output file ID 33 indicative of saving files (memory areas) for error analysis information, and an object server ID 34 indicative of network addresses of servers to perform transfer operation (saving operation) on error analysis information from the source files to the saving files.

As shown in FIG. 5, in the error notifying message management table 30, plural sets of resource definition data can be registered corresponding to one message ID. That is, in the present invention, to automatically save error analysis information, necessary for investigation into the cause of error, stored in a plurality of sites, a plurality of servers to perform saving operation on error analysis information and input-output files to access for each server can be defined with respect to software program executed by the plurality of servers in cooperation with each other to perform data processing when an error occurs in one server. These table information are registered by an administrator or the like for each of the software products 41, upon configuration of the distributed data processing system.

Note that in the error notifying message management table 30 in FIG. 5, one data record with the message ID 31 as an index code includes plural sets of resource definition data. However, the table may be arranged such that a plurality of data records having the same message ID (index code) are prepared, and one data record includes one set of resource definition data.

When the monitoring terminal 11 receives the SYSLOG message 60 from the server 12, it extracts the message ID 621 from the received message by the message receiving program 22, and starts an error notifying message processing program 23.

Figure 6:
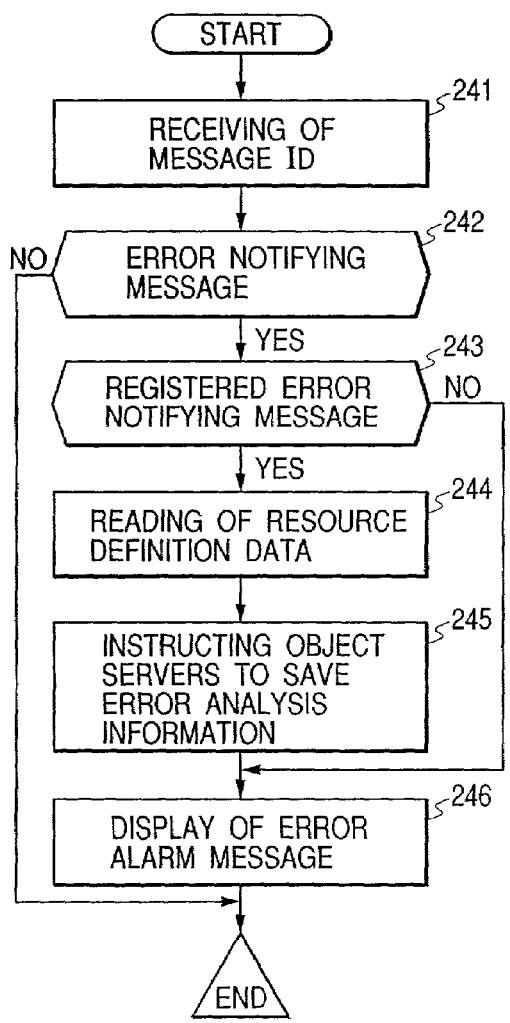
FIG. 6 is a flowchart showing an error notifying message processing program 23 executed by the monitoring terminal.

As shown in FIG. 6, the error notifying message processing program 23 receives the message ID 621 (step 241), and determines whether or not the received message is a normal SYSLOG message or an error notifying message (step 242).

If the received message is a normal SYSLOG message, the error notifying message processing program 23 ends. If the received message is an error notifying message, the error notifying message management table 30 is referred to, and it is determined whether or not the message ID 621 corresponds to any one of the message ID's 31 registered in the management table 30 (step 243).

If there is no message ID corresponding to the message ID 621 in the management table 30, an error message having a display content corresponding to the above message ID 621 is displayed on the display 52 (step 246). The error message may be outputted to the display via the notification general management control program 21.

If it is determined at step 243 that the message ID 621 corresponds to any one of the message ID's 31 registered in the management table 30, a data record including the corresponding message ID 31 is read from the management table 30 (step 244), and servers designated by the object server ID 34 are instructed to save error analysis information (step 245). Thereafter, the error message corresponding to the above message ID 621 is displayed on the display device 52 (step 246).

The saving instruction to save error analysis information is attained by forwarding the data record read from the management table 30 to the general management control program 21, then transmitting a control message including an instruction to save error analysis information, the data file ID 32 and the output file ID 33, from the general management control program 21 to the respective servers specified by the object server ID 34. If plural sets of resource definition data are registered in the management table 30 corresponding to the message ID 31, the saving instruction to save error analysis information is issued to a plurality of servers based on the plural sets of resource definition data.

Figure 7:
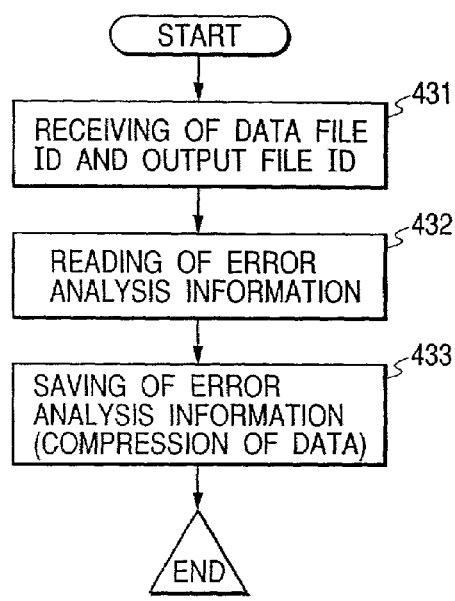
FIG. 7 is a flowchart showing an error analysis information saving program 43 executed by the server.

The respective servers 12 receive the control message from the monitoring terminal 11, and perform the error analysis information saving program 43 as shown in FIG. 7.

First, the data file ID 32 and the output file ID 33 are received from the received message (step 431), then data existing in a memory area specified by the data file ID 32 is read as error analysis information (step 432), and the data is written into a memory area in the saving file 56 specified by the output file ID 33 (step 433). The error analysis information written into the saving file 56 may be compressed data so as to reduce a necessary memory capacity.

The respective servers 12 hold the error analysis information in the saving file 56 until the monitoring terminal 11 instruct to delete the information. Further, when the respective servers 12 receive a control message requiring transfer of the error analysis information from the monitoring terminal 11, the respective servers 12 read the error analysis information from the saving file 56, and transfer the information to the monitoring terminal 11. The transfer request message requiring transfer of the error analysis information is generated in execution of a program (not shown) for investigation into cause of error/recovery processing, started in response to a command inputted from the input device 53, by the operator of the monitoring terminal 11 who has seen the error notification outputted on the display 52.

In the above embodiment, as the index code in the error notifying message management table 30, the message ID 31 comprising the software identifier (main code) and error status code (additional code) is employed, and it is determined whether or not saving of error analysis information is necessary by comparing the index codes with the message ID 621 included in a received message.

However, if it is arranged such that it is determined whether or not the additional code of the message ID 621 indicates a specific error requiring saving of error analysis information, at the determination step 242 in the error notifying message processing program 23 as shown in FIG. 6, the comparison between the index codes (additional codes) with the message ID 621 using the management table 30 is unnecessary. That is, only the software identifier in place of the message ID may be employed as the index codes 31 in the management table 3, and it may be arranged such that a software identifier set as the main code is extracted from the message ID 621 of each received message, and is compared with the index codes in the management table.

As it is apparent from the description of the above embodiment, according to the present invention, when an error occurs in one computer (server) in a computer network, a monitoring terminal which has received error notification from the computer automatically issues a saving instruction to computers which are to perform saving operation, and the computers which received the saving instruction automatically save error analysis information into saving files. This arrangement prevents lost of the error analysis information necessary for investigation into the cause of the error.

Further, according to the present invention, when an error occurs in one computer, the monitoring terminal automatically issues the saving instruction to other computers related to the error. This arrangement is very advantageous especially in a distributed data processing system where a plurality of computers perform data processing in cooperation with each other, for investigation into the cause of error and recovery processing.

As many apparently widely different embodiments of the present invention can be made without departing from the spirit and scope thereof, it is to be understood that the invention is not limited to the specific embodiments thereof except as defined in the appended claims.

What is claimed is:

1. A storage medium for storing a program to be executed by a computer connected to a plurality of servers via a communication network, said program performing:

referring to a data record in a management table upon receiving an error notifying message from one of said servers, in accordance with a message identifier indicated in the received error notifying message, said data record defining at least one set of resource definition data corresponding to said message identifier, said resource definition data indicating a source data file identifier and a server identifier; and instructing at least one of said servers specified by the server identifier of the referred data record to save error analysis information from a data file specified by the source data file identifier of the referred data record.

2. A storage medium for storing a program according to claim 1, wherein said resource definition data further indicating an output file identifier correspondingly to said message identifier, and said at least one of said servers specified by the server identifier is instructed to save said error analysis information from said data file specified by the source data file identifier to a data file specified by the output file identifier of the referred data record.

3. A storage medium for storing a program according to clam 1, wherein said message identifier indicated in the received error notifying message includes a software identifier indicative of a software being executed by one of said servers from which the error notifying message having been issued, and said data record referred to in response to said error notifying message defines said at least one set of resource definition data correspondingly to said software identifier.

4. A storage medium for storing a program according to claim 1, wherein said message identifier in the received error notifying message includes a software identifier indicative of a software being executed by one of said servers from which the error notifying message is issued and an additional code indicative of the type of an error detected in the server, and said data record in the management table defines said resource definition data correspondingly to a combination of a software identifier and the type of an error code, and said instructing of saving the error analysis information is carried out according to a data record having a software identifier and the type of an error code matched with that of the error notifying message.

5. A storage medium for storing a program according to claim 1, wherein said program further performs the step of outputting an error message to a display of said computer based on the contents of said received error notifying message.

6. A storage medium for storing a program to be executed by a computer connected to a plurality of servers via a communication network, said program performing:

checking whether any specific error requiring saving of error analysis information is indicated in an error notifying message received from one of said servers;

referring to a data record in a management table in accordance with a software identifier indicated in the received error notifying message when it is detected through the checking step that a specific error requiring saving of error analysis information has occurred, said data record defining at least one set of resource definition data corresponding to said software identifier, said resource definition data indicating a source data file identifier and a server identifier; and instructing at least one of said servers specified by the server identifier of the referred data record to save error analysis information from a data file specified by the source data file identifier of the referred data record.

7. A storage medium for storing a program according to claim 6, wherein said resource definition data further indicating an output file identifier correspondingly to said message identifier, and said at least one of said servers specified by the server identifier is instructed to save said error analysis information from said data file specified by the source data file identifier to a data file specified by the output file identifier of the referred data record.

8. A storage medium for storing a program according to claim 6, wherein said program further performs the step of outputting an error message to a display of said computer based on the contents of said received error notifying message.

9. A machine having a program to be executed by the machine for communicating with a plurality of servers via a communication network, said program performing:

referring to a data record in a management table upon receiving an error notifying message from one of said servers, in accordance with a message identifier indicated in the received error notifying message, said data record defining at least one set of resource definition data corresponding to said message identifier, said resource definition data indicating a source data file identifier and a server identifier; and instructing at least one of said servers specified by the server identifier of the referred data record to save error analysis information from a data file specified by the source data file identifier of the referred data record.

10. A machine according to claim 9, wherein said resource definition data further indicating an output file identifier correspondingly to said message identifier, and said at least one of said servers specified by the server identifier is instructed to save said error analysis information from said data file specified by the source data file identifier to a data file specified by the output file identifier of the referred data record.

11. A machine according to claim 9, wherein said message identifier indicated in the received error notifying message includes a software identifier indicative of a software being executed by one of said servers from which the error notifying message having been issued, and said data record referred to in response to said error notifying message defines said at least one set of resource definition data correspondingly to said software identifier.

12. A machine according to claim 9, wherein said message identifier in the received error notifying message includes a software identifier indicative of a software being executed by one of said servers from which the error notifying message is issued and an additional code indicative of the type of an error detected in the server, and said data record in the management table defines said resource definition data correspondingly to a combination of a software identifier and the type of an error code, and said instructing of saving the error analysis information is carried out according to a data record having a software identifier and the type of an error code matched with that of the error notifying message.

13. A machine according to claim 9, wherein said program further performs the step of outputting an error message to a display of said computer based on the contents of said received error notifying message.

14. A machine having a program to be executed by a computer for communicating with a plurality of servers via a communication network, said program performing:

checking whether any specific error requiring saving of error analysis information is indicated in an error notifying message received from one of said servers;

referring to a data record in a management table in accordance with a software identifier indicated in the received error notifying message when it is detected through the checking step that a specific error requiring saving of error analysis information has occurred, said data record defining at least one set of resource definition data corresponding to said software identifier, said resource definition data indicating a source data file identifier and a server identifier; and instructing at least one of said servers specified by the server identifier of the referred data record to save error analysis information from a data file specified by the source data file identifier of the referred data record.

15. A machine according to claim 14, wherein said resource definition data further indicating an output file identifier correspondingly to said message identifier, and said at least one of said servers specified by the server identifier is instructed to save said error analysis information from said data file specified by the source data file identifier to a data file specified by the output file identifier of the referred data record.

16. A machine according to claim 14, wherein said program further performs the step of outputting an error message to a display of said computer based on the contents of said received error notifying message.

* * * * *